May 15, 1956     W. C. HEWITT     2,745,823
CONTROL OF TEMPERATURE IN EMULSION POLYMERIZATION
Filed Dec. 4, 1951
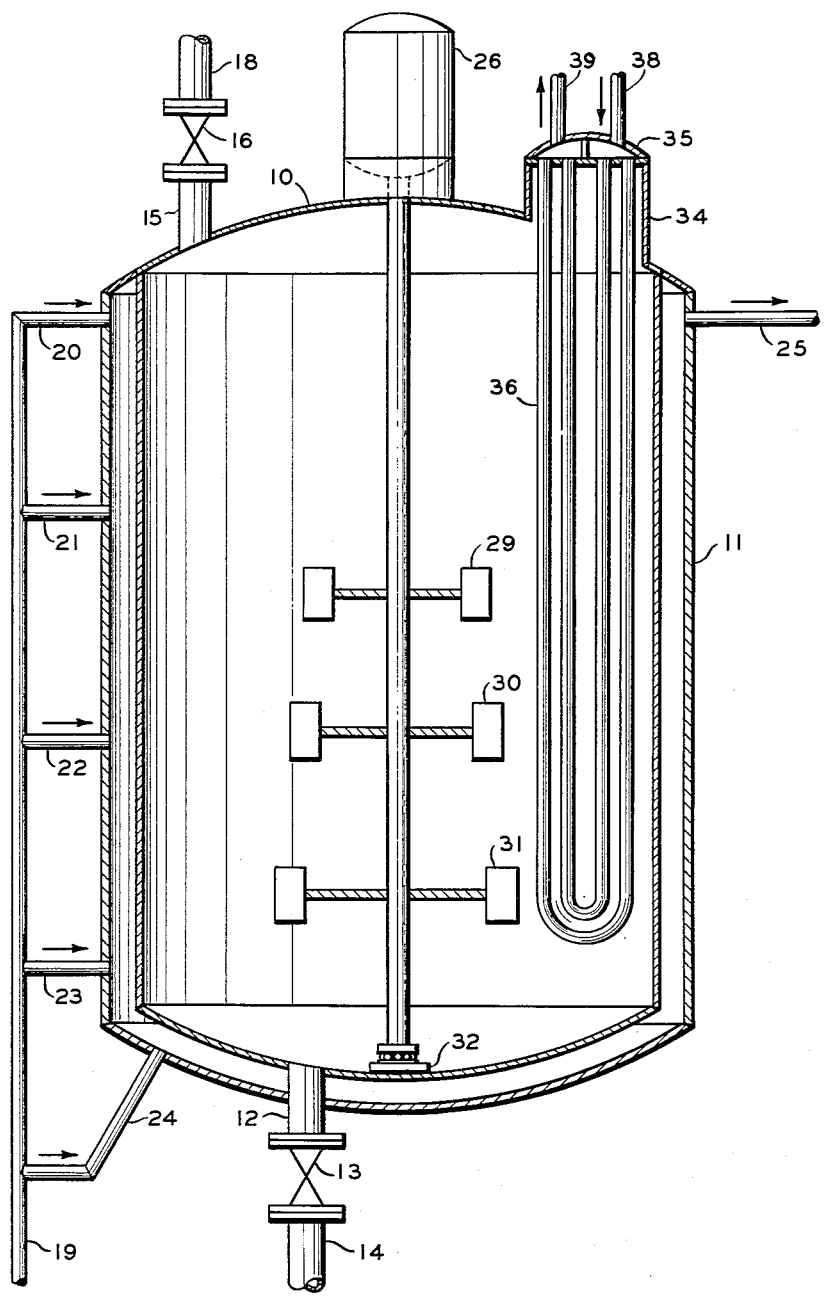
INVENTOR.
W. C. HEWITT
BY Hudson & Young
ATTORNEYS

United States Patent Office 2,745,823
Patented May 15, 1956

2,745,823

CONTROL OF TEMPERATURE IN EMULSION POLYMERIZATION

William C. Hewitt, Bartlesville, Okla., assignor to Phillips Petroleum Company, a corporation of Delaware Application December 4, 1951, Serial No. 259,751

3 Claims. (Cl. 260—83.7)

This invention relates to the production of polymeric material. More particularly this invention relates to the emulsion polymerization of polymerizable materials. In one of its aspects this invention relates to the emulsion polymerization of aliphatic conjugated dienes. In another of its aspects, the present invention relates to the removal of heat of reaction released in a process for the production of high molecular weight polymers and especially synthetic rubber latices.

It is known that although the rate of polymerization can be increased by raising the polymerization temperature, the quality of the elastomer is improved when the polymerization is carried out at a lower temperature. Processibility, tensile strength and elasticity are generally improved by carrying out emulsion polymerization at low temperatures. One difficulty has always been the removal of heat of reaction of polymerization so as to maintain a desired, substantially isothermal reaction temperature or at least a reaction temperature within certain desired or optimum limits. If the rate of reaction or polymerization of materials undergoing polymerization is increased, as by operating at a higher temperature level or by the use of so called fast-acting recipes, the rate of removal of the heat of reaction must proportionately be increased, otherwise run away conditions of temperature and reaction rate will prevail. Heat removal or cooling is more difficult at lower reaction temperatures since the heat of reaction remains substantially unchanged but the temperature differential between the reaction mixture and the coolant employed is decreased, thereby reducing the cooling rate. Heretofore, the heat of reaction released during an emulsion polymerization reaction has been removed by providing the reactor with a jacket and flowing through the jacket a suitable low temperature heat exchange fluid as coolant.

A reactor having a jacket therein as the sole means of removing the heat of reaction has not been satisfactory for the production of low temperature synthetic rubber, especially when a fast acting recipe is employed. The heat of reaction is released at a rate greater than that at which it can be removed or taken up by the heat exchange fluid in the jacket. As a result, substantially isothermal reaction conditions are not obtainable and undesirable reaction temperatures and rates occur. If fast acting recipes were used and if temperature control were maintained, greater production of a superior synthetic rubber would be possible. Heretofore, even the recipes which could be used required long periods of time to complete the polymerization reaction because of slow removal of heat from the reactors. Production could be greatly increased by using faster acting recipes if it were possible to maintain the temperature in the reactors within a given range by quickly removing the heat of reaction. Often the reaction gets out of hand and the batch has to be short stopped with only a fraction of the reactants converted or else the temperature became too high and the batch did not meet specifications. In other words, it might be said that the recipes used were those which produced the fastest rates of polymerization that could be controlled most of the time. In the practice of my invention, the faster recipes can be used, still faster ones which are available or being developed can be used to increase the production of the synthetic rubber.

Various methods and techniques have been proposed and tried for maintaining the reaction temperature substantially isothermal or within desired limits and to increase the rate of removal of the heat of reaction. Heretofore none have proven satisfactory. An extremely cold heat exchange fluid such as ammonia for use in the reactor jacket has been proposed, however, it has been thought that localized undercooling would occur which would interfere with the polymerization reaction. It has also been proposed to install scrapers for scraping the inside walls of the reactor so as to obtain better heat transfer. It has also been proposed to install a draft tube in the middle of the reactor to cause the materials undergoing polymerization to circulate up through the draft tube and down along the inside of the reactor in an attempt to increase the over all heat transfer coefficient through the reactor wall. Also, different types of blades have been installed on the stirrer or agitator within the reactor without any significant improvement in the heat transfer rate. Small amounts of electrolytes have been added to the reactor contents in order to decrease the viscosity so as to increase the heat transfer through the walls of the reactor. This too, was not accompanied by any significant change in the rate of heat transfer through the reactor walls. It has even been proposed to circulate the reactants undergoing polymerization through a heat exchanger or cooler located outside the reactor. However, by employing this scheme it is necessary to take extreme precautions to keep from contaminating the reactants with dissolved metal, etc., and much additional equipment is required.

For obvious reasons it is desirable to increase the output or productivity per reactor employed in the production of synthetic rubber by the emulsion polymerization method. Fast acting recipes which increase the reaction rate and which accordingly would increase productivity are available. These recipes, however, cannot be satisfactorily employed for the production of a synthetic rubber by emulsion polymerization in a jacketed reactor due to the fact that the heat of reaction cannot be removed fast enough. Low temperature synthetic rubber production is particularly affected by this situation. As a result, slow reaction rates commensurate with the ability of the reactor cooling jacket to remove the heat of reaction must be employed and productivity per unit reactor suffers and remains low and maximum productivity is not realized.

It is an object of this invention to provide a method and apparatus for the production of synthetic rubber by the emulsion polymerization technique. It is another object of this invention to provide a process and apparatus whereby the productivity per reactor employed in the manufacture of synthetic rubber is increased. It is still another object of this invention to provide an improved method and apparatus for the production of low temperature synthetic rubber. It is yet another object of this invention to provide an improved method and apparatus for the removal of the heat of reaction released during an emulsion polymerization reaction. In at least one embodiment of this invention at least one of these objects will be attained.

It has now been discovered that productivity per reactor employed in an emulsion polymerization process for the production of polymeric material is greatly increased by immersing a suitable heat exchanger into the body of materials undergoing emulsion polymerization, i. e., internally cooling the reaction mixture. By employing my invention, productivity per reactor (product output per unit time per reactor) is doubled. Indeed, by employing my invention it is possible to increase productivity many times over that possible by conventional methods presently employed. For example, heretofore by the conventional methods the average time required per reactor to produce a batch of 41° F. 1,3-butadiene-styrene synthetic rubber was 13 hours. In actual practice the time required varied from 10 to 20 hours or more. If 10 hours were required it was usually the result of the reaction temperature getting out of control and the reaction occurring at a higher temperature than that which was desired. This is undesirable since the butadiene-styrene copolymer synthetic rubber produced at this higher temperature is distinctly inferior to that produced at a lower temperature. By the practice of this invention the time required is reduced to 6 hours, a reduction in reaction time of more than 50 per cent and with a concomitant productivity increase of 100 per cent. By employing faster polymerization recipes together with the practice of my invention, the time required for the reaction to reach completion can be reduced to 3 hours or less, a reduction in reaction time of more than 75 per cent and with a concomitant productivity increase of more than 300 per cent.

For a long time many methods have been sought and tried as indicated hereinbefore, in an attempt to increase the productivity per reactor for the production of butadiene-styrene synthetic rubber and without any significant success. The necessity for a high rate of removal of the heat of reaction required by increased productivity remained a serious and apparently insoluble bottleneck for increased production. Many seemingly valid reasons presented themselves and indicated that this invention would be impractical, ineffective and lead to numerous operating difficulties. I have swept aside all these difficulties and broken the production bottleneck, and have demonstrated in actual full scale, commercial operation that my invention greatly increases productivity per reactor, is completely feasible, creates no operating difficulties and in fact produces unexpected results and benefits.

The heat exchanger which is immersed in the mass of reactants undergoing emulsion polymerization in accordance with my invention may be made by any suitable design or construction. The heat exchanger can be made of any material of construction which is not attacked or corroded either by the reactants or during actual service conditions. Obviously, the heat exchanger should be made of materials which are not attacked by the heat exchanger fluid or coolant employed therein. A suitable material is a stainless steel such as type 318 stainless steel. Clad or plated metals or non-metallic materials (i. e., glass) may also be employed. It is preferable that the material of construction be metallic and possess high heat conductivity in order that the heat transfer coefficient through the walls or tubes of the heat exchanger be high.

As indicated above, the heat exchanger may be of any suitable design. A U-shaped bundle of tubes is preferred and yields excellent results. A plurality of heat exchangers may be immersed in the body of reactants undergoing polymerization. In place of a U-shaped bundle of tubes, a concentric heat exchange coil can be placed within the reactor. However, this is not preferred due to the difficulties which arise in the installation of this type of heat exchanger. Caution, of cause, must be exercised in the installation of the heat exchanger to prevent damage to the reactor walls which may be glass lined. The location of the heat exchanger within the reactor must be selected so as not to interfere with the operation of any other equipment therein such as the agitator. The heat exchanger, of course, should be located within the reactor and in contact with the reactants so as to obtain the maximum cooling effect upon the reactants.

As an added feature and benefit of this invention it has been found that the installation of a heat exchanger or cooling coil into the body of reactants increases the average over all heat transfer coefficient. In an actual test it has been found that the heat transfer coefficient increased more than 16 per cent in value by merely suspending a bundle of U-shaped tubes within the reactor. That is, the increased heat transfer through the cooling coil raises the over-all heat transfer sufficiently so that if the entire amount is credited to the reactor walls it would amount to a 16 per cent increase in heat transfer coefficient.

A heat exchanger employed in the process and apparatus of my invention is located within the reactor and in contact with the aqueous emulsion therein, preferably in a zone within the reactor wherein the velocity of the reactants is greatest or at least substantially higher than elsewhere. More than one zone of relatively high velocity may exist within the reactor depending, of course, on whether one or more agitators and/or heat exchangers (which may be as many as six or more in number) are used and their location. By locating the heat exchangers in a zone of higher velocity not only is better heat transfer rates and cooling achieved but also any solid polymer which tends to build up on the heat exchange surface is removed or washed away by the reactants. These effects are greatest when the reactants flow perpendicularly or substantially perpendicularly against the heat exchange surface. Accordingly, in one embodiment of my invention I employ fluid-mixing impelling or accelerating means and heat exchangers spaced alternately apart, preferably in line or in a circle, within the reactor. As the reactant emulsion flows into the heat exchanger, if the heat exchanger comprises a tube bundle, the velocity of at least a portion of the liquid reactant mass increases in the spaces between the tubes thereby improving heat transfer and preventing deposition of solid polymer upon the heat transfer surface.

The invention will be better understood from the accompanying disclosure by reference to the accompanying drawing which shows diagrammatically an arrangement of apparatus for the practice of my invention in the emulsion polymerization of 1,3-butadiene-styrene for the production of synthetic rubber.

Referring now to the accompanying drawing, therein is illustrated reactor 10 fitted with a heat exchanger or cooling jacket 11. The reactor may be of any suitable size or shape but is generally a closed, upright, substantially cylindrical container equipped with a suitable outlet 12 at the bottom thereof. A quick opening valve 13 is attached to the outlet and connected to conduit 14 to permit quick dumping of the reactor contents. The reactor is shown fitted at the top with inlet 15 to which valve 16 is attached. Valve 16 communicates with conduit 18 which supplies the reactants to the reactor.

A suitable coolant such as water, brine or methanol-water is supplied to the reactor jacket by conduit 19 via a plurality of inlet conduits 20, 21, 22, 23 and 24 and emerges from the jacket via outlet conduit 25. The reactor is also fitted with a suitable agitator which comprises power unit 26, shaft 28 and paddles or blades 29, 30 and 31 spaced longitudinally along the shaft. A suitable guiding and support means 32 may be provided at the bottom of the shaft.

Suspended into the reactor upon and from a suitable inlet 33 on the top and offset from the agitator is a two pass U-shaped heat exchanger comprising an upper outer shell 34, head 35 and tube bundle 36. Coolant is supplied thereto via line 38 and emerges therefrom via line 39. The tube bundle should not interfere with the agitator and preferably a clearance of at least about 8 inches should be maintained with the closest agitator blade or impeller. At the same time ample clearance should be provided between the wall of the reactor and the tube bundle so as to permit easy and quick insertion and removal of the tube bundle. If desired, of course, the heat exchanger may enter the reactor either from the side or bottom.

While this invention has been explained and illustrated with reference to one particularly effective and preferred embodiment of this invention it is, of course, not intended to limit my invention to this particular embodiment. A plurality of heat exchangers may be suspended within the reactor. Furthermore, the heat exchanger need not necessarily comprise a two-pass U-shaped tube bundle but may comprise a suitable concentric or helical coil or any other time of heat exchanger suitable for direct, internal cooling and insertion within the reactor.

In order to demonstrate the advantages to be obtained by employing my invention in actual commercial operation a number of full scale plant tests were performed. The heat exchanger employed comprised a two-pass U-shaped tube bundle made up of ¾ inch, 16 BWG, type 316 stainless steel. The tube bundle comprised 30 tubes having an average length of 22 feet. Although the total cooling surface obtainable with this bundle is 130 square feet only about 100 square feet can be considered to be effective cooling surface as only that amount was submerged in the reactants. Since the total displacement of the bundle is small, only about 20 gallons, no decrease in the reactor loading was necessary. To control the reaction temperature it was only necessary to employ average maximum flow rates of 150 G. P. M. and 20 G. P. M. through the reactor jacket and tube bundle respectively. Actually, this was an increase in coolant flow of only 20 G. P. M. over the normal requirement since the reactor jacket flow rate in a batch operation requiring 10–20 hours to 60 per cent conversion without employing my invention requires 150 G. P. M.

The reactor provided with mechanical stirrers was charged to 90 per cent capacity. An aqueous methanol solution at a temperature of about 0° to 10° F. was passed through the reactor jacket and the heat exchanger suspended therein. The reaction was started at a temperature of about 41° F. and the rate of circulating coolant was regulated according to the temperature in the reactor in order to maintain a substantially isothermal reaction temperature. The reactor had a capacity of about 24,432 pounds of charging material. The emulsion polymerization recipe employed was as follows:

| Ingredient | Parts by Weight |
| --- | --- |
| Water | 200 |
| 1,3-butadiene | 76 |
| Styrene | 24 |
| Dresinate-214 [1] | 4 |
| Potassium chloride | 0.25 |
| Trisodium phosphate + 12H$_2$O | 0.25 |
| Tamol-n [2] | 0.15 |
| FeSo$_4$7H$_2$O | 0.20 |
| Potassium pyrophosphate | 0.22 |
| Cumene hydroperoxide | 0.125 |

[1] Potassium soap of dehydrogenated (disproportionated) rosin.
[2] Sodium salt of a condensed aryl sulfonic acid.

The test results are set forth in Table No. I:

*Table No. I*

| Run No. | Desired Reaction Temperature | Average Reaction Temperature | Peak Reaction Temperature | Final Time in Hrs. | Final Percent Conversion | Time in hrs. to 60% Conversion |
| --- | --- | --- | --- | --- | --- | --- |
| 1 | 40 | 41.3 | 42 | 7.75 | 54.9 | 8.5 |
| 2 | 40 | 40.1 | 42 | 8.25 | 53.4 | 9.3 |
| 3 | 42 | 42.5 | 45 | 7.5 | 60.0 | 7.5 |
| 4 | 42 | 43.7 | 44 | 6.25 | 51.6 | 7.3 |
| 5 | 42–44 | 42.9 | 44 | 8.0 | 58.8 | 8.2 |
| 6 | 42–44 | 43.6 | 46 | 9.8 | 60.0 | 9.8 |
| 7 | 42–44 | 43.6 | 46 | 9.5 | 63.6 | 9.0 |
| 8 | 44 | 44.3 | 45 | 7.5 | 59.7 | 7.5 |
| 9 | 44 | 44.1 | 46 | 8.0 | 65.4 | 7.3 |
| 10 | 44 | 44.1 | 45 | 7.8 | 54.6 | 8.5 |

It should be noted that the temperature control as evidenced by the peak temperature and average reaction temperature for all the runs was excellent. Even closer temperature control is possible with my invention. In similar runs for 41° F. synthetic rubber performed wherein the reactor jacket provided the only cooling surface and without immersing a cooling coil or tube bundle into the reactants, peak temperatures of 45–50° F. and higher for reactions which require 12–13 hours to go to completion were usually encountered. By employing my invention, the reaction is completed in a fraction of the time heretofore required and without experiencing undesirable high (>50° F.) peak temperatures.

This invention is particularly useful in the practice of making synthetic rubber by the emulsion polymerization technique at temperatures of 41° F., and lower, such as at 0° F. Rubber made by polymerization at temperatures even lower than 41° F. has many superior properties. Rubber made at temperatures such as 0° F. would have been made commercially and used, if methods had been known to control the temperature of polymerization at this low temperature. With my invention solving the control of the temperature of polymerization, rapid strides can be made to commercialize low temperature rubber such as that made at 0° F. In reactions carried out at about 0° F., faster reacting polymerization recipes (which are known) can be used. Also, this invention is useful in the practice of making synthetic rubber by the emulsion polymerization technique at temperatures higher than 41° F., such as the emulsion polymerization of 1,3-butadienestyrene at about 112° F. At this temperature, an activator can be used to increase the rate of reaction.

The practice of my invention is broadly applicable to the emulsion polymerization technique for the production of polymeric material and the like and is particularly applicable to emulsion polymerization reactions carried out at relatively low temperatures, about 40–45° F. or less.

In emulsion polymerization it is generally preferred that the emulsion be of an "oil in water" type, with the ratio of aqueous medium (the continuous phase) to monomeric material being between about 1.1:1 and about 2.75:1. In fact, the water to monomer ratio can be as low as 0.15:1. At low ratios the emulsion tends to have high viscosities and at high ratios the productivity per reactor is low. The emulsion polymerization may be carried out in a batchwise operation or semi-continuously or continuously. The total pressure on the reactants should be at least as great as the vapor pressure of the reaction mixture so as to maintain the reactants in the liquid phase.

The monomeric material which may be reacted to produce high molecular weight polymers or synthetic rubber in a polymerization reaction employing my invention includes those unsaturated organic compounds which contain the structure $CH_2=C<$ and, in most cases, have at least one of the disconnected valencies attached to an electronegative group, that is, a group which increases the polar character of the molecule, such as a chlorine atom or an organic group containing a double or triple bond such as vinyl, phenyl, nitrile, carboxy, or the like. Included in this class of monomers are the conjugated diolefins. I prefer conjugated diolefins having from 4 to 6 carbon atoms, for example, 1,3-butadiene (butadiene); 2,3-dimethyl-1,3-butadiene; isoprene; piperylene; 3-furyl-1,3-butadiene; 3-methoxy-1,3-butadiene, and the like. Other suitable materials are the haloprenes such as chloroprene (2-chloro-1,3-butadiene); bromoprene; methylchloroprene (2-chloro-3-methyl-1,3-butadiene) and the like; the aryl olefins such as styrene, the various alkyl styrenes; p-chlorostyrene; p-methoxystyrene; 2-methyl styrene; vinylnaphthalene and similar derivatives thereof and the like; acrylic and substituted acrylic acids and their esters; nitriles and amides such as acrylic acid methacrylic acid, methyl acrylate, ethyl acrylate, methyl 2-chloroacrylate methyl methacrylate, ethyl methacrylate, butyl methacrylate, methyl ethacrylate, acrylonitrile, methacrylonitrile, methacrylamide and the like; methyl isopropenyl ketone, methyl vinyl ketone, methyl vinyl ether, vinylethinyl alkyl carbinols, vinyl acetate, vinylchloride, vinylidene chloride, vinylfurane, vinylcarbazole, vinylacetylene and other unsaturated hydrocarbons, esters, alcohols, acids, ethers, etc., of the types described. In general, my invention is applicable to the emulsion polymerization of these materials which polymerize either alone or with another copolymerizable material. These materials may be polymerized alone, in which case simple homopolymers are formed, or mixtures of two or more materials which are copolymerizable with each other may be polymerized to form copolymers.

Various modifications and substitutions which are within the spirit or scope of this invention will suggest themselves to those skilled in the art upon reading this disclosure.

I claim:

1. The method of controlling the temperature of polymerization of a monomeric material comprising a conjugated diene which comprises charging a stream of said monomeric material to a smooth-walled reaction zone, charging water, an emulsifier, an oxidant and an activator to said zone to provide an aqueous emulsion therein, circulating a cooling medium in a plurality of separately spaced elongated confined paths bounded by walls of heat transfer material located within said reaction zone adjacent the inner wall thereof to remove an additional portion of said heat of reaction, such paths extending principally in a vertical direction, stirring said emulsion to produce a whirling movement thereof about a vertical axis of said zone with increasing velocity of movement proceeding from said axis toward the walls of the reaction zone, said velocity being sufficient to sweep away particles of polymeric material deposited on the walls defining said confined paths and thus to prevent fouling of said walls, and withdrawing a polymerized product from said reaction zone.

2. Process of claim 1 wherein the monomeric material is a mixture of 1,3-butadiene and styrene.

3. Process of claim 1 wherein a heat exchange fluid is circulated in contact with the exterior of the reaction zone to remove a portion of the exothermic heat of polymerization.

References Cited in the file of this patent

UNITED STATES PATENTS

| | | |
|---|---|---|
| 2,085,924 | Riegler | July 6, 1937 |
| 2,263,534 | Aldridge | Nov. 18, 1941 |
| 2,363,834 | Crater | Nov. 28, 1944 |
| 2,458,456 | Wolk | Jan. 4, 1949 |
| 2,459,636 | Fenney | Jan. 18, 1949 |
| 2,465,363 | Faragher et al. | Mar. 29, 1949 |
| 2,475,016 | DeNie | July 5, 1949 |
| 2,575,855 | Stengel et al. | Nov. 20, 1951 |
| 2,596,610 | Shabaker | May 13, 1952 |